April 2, 1963   F. R. WILSON   3,083,755
TUBE CLAMPING MEANS
Filed Sept. 23, 1955
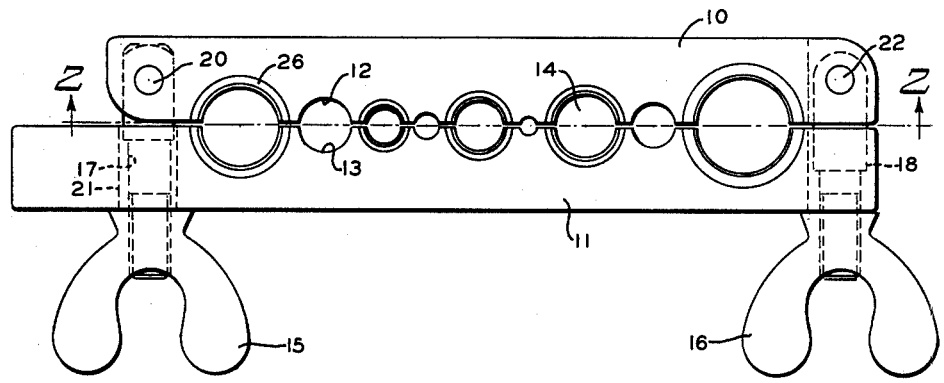
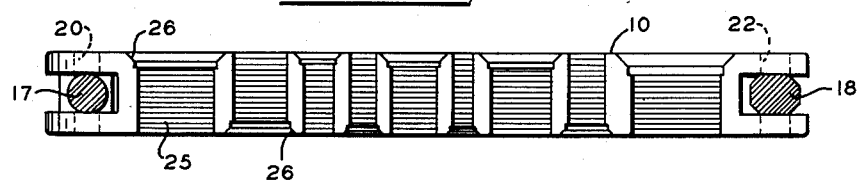
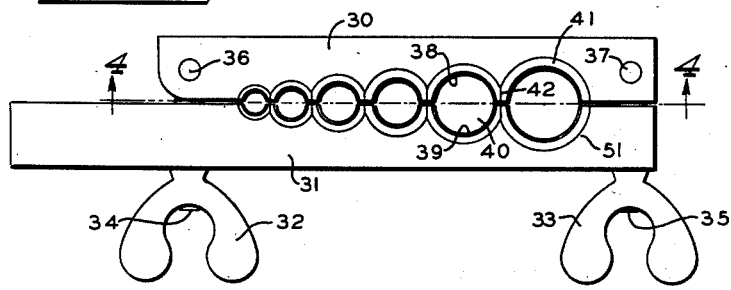
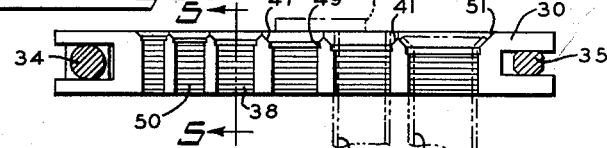
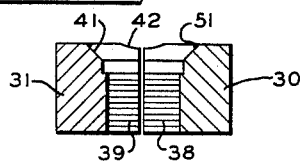
INVENTOR.
FRANK R. WILSON
BY
DES JARDINS, ROBINSON & KEISER
Howard L. Keiser 3,083,755
TUBE CLAMPING MEANS
Frank R. Wilson, 4948 Briarcliff Road, Memphis, Tenn.
Filed Sept. 23, 1955, Ser. No. 536,128
3 Claims. (Cl. 153—79)

This invention relates to tube clamping means for tube flaring tools of the hand operated type and, more particularly, to bar-type clamping means in which the tube clamping recesses are serially arranged along the meeting edges of the clamping bars.

A simple and effective type of tube clamping means for holding the tubing to be worked in the tube flaring tools is one in which matching pairs of tube clamping recesses for holding the various sizes of tubing are arranged serially along the meeting faces of a pair of clamping bars. The bars are adapted to be drawn together so as to clamp between them the piece of tubing to be worked upon. This type of holding device, i.e., a bar-type clamping means, is simple and durable but tends to be quite heavy and cumbersome especially in cases where it is designed to accommodate the larger sizes of tubing.

Accordingly, it is an object of the present invention to reduce the size and weight of bar-type clamping devices so as to facilitate their use with hand-operated tube flaring tools. To accomplish this purpose, I propose, in one case, to form the chamfers of alternate clamping recesses on opposite sides of the bars so as to permit closer spacing of the recesses without causing the chamfers to overlap or intersect one another. Inasmuch as the chamfers are relied upon to support the wall of the flare being formed on the end of a tube and to permit the flare to be ironed out by the flaring cone at the end of its downward travel, any overlapping or intersecting of the chamfers in the area where they provide support for the wall of the flare would cause undesirable indenting of the metal at this point. In another form of my invention where the chamfers are of greater than normal depth and are all formed on the same side of the clamping bars, I accomplish the desired reduction in the size and weight of a bar-type clamping means by permitting the chamfers to overlap one another to the extent of the excess depth of the chamfers. Certain advantages are obtained by making the chamfers of greater than normal depth. One advantage of so doing is that it enables the depth of flare to be gauged by simply inserting the tubing to be flared in the clamping bars to the point where its upper end lies flush with the upper faces of the bars. Another advantage is that the clamping bars may be made from powdered metal without any need for subsequent machining after sintering. In forming the bars by means of the powdered metal technique, when the compact is withdrawn from the mold, a small burr tends to be pulled out along the upper edge of the chamfer which, unless subsequently removed, would cause a circumferential groove to be indented around the top of the flare. However, if the chamfer is of sufficient depth that the top of the flare does not reach the top of the chamfer, this burr will have no detrimental effect on the flare produced on the tube. Hence, I propose to provide chamfers having a depth somewhat greater than that normally provided for accommodating properly dimensioned flares, and to overlap the chamfers so formed to approximately the extent of their excess depth so that minimum spacing between the recesses may be achieved.

Accordingly, it is another object of my invention to provide, in a bar-type clamping means, tube clamping recesses in which the chamfers of alternate recesses are located on opposite sides of the clamping bars so as to permit closer spacing between the recesses.

Another object of my invention is to provide a bar-type tube clamping means wherein the chamfers are all located on the same side of the clamping bars but are made of greater than normal depth, and wherein the chamfers are permitted to overlap to the extent of their excess depth.

With these and other objects in view which will become apparent from the following description, the invention includes certain novel features of construction and combination of parts, the essential elements of which are set forth in the appended claims and a preferred form or embodiment of which will hereinafter be described with reference to the drawings which accompany and form a part of this specification.

In the drawings:

FIG. 1 is a plan view of a bar-type clamping means incorporating the teachings of my invention.

FIG. 2 is a cross-sectional view taken along the line 2—2 in FIG. 1.

FIG. 3 is a plan view of a bar-type clamping means of modified construction.

FIG. 4 is a cross-sectional view taken along the line 4—4 in FIG. 3.

FIG. 5 is a cross-sectional view taken along the line 5—5 in FIG. 4.

In FIG. 1 is shown a bar-type clamping means comprised of a pair of clamping bars 10 and 11 which are provided with matching pairs of semi-cylindrical slots 12 and 13, respectively which, when the bars are brought together, as illustrated in FIG. 1, provide circular clamping recesses 14 for holding the tubing to be flared by the flaring tool (not shown). The bars 10 and 11 are adapted to be drawn together in face-to-face relation, as shown in FIG. 1, by a pair of wing nuts 15 and 16 which are screwed onto the threaded ends of clamping bolts 17 and 18, respectively. As indicated in FIGS. 1 and 2, the bolt 17 is pivotally secured to the bifurcated left-hand end of the bar 10 by a pin 20 and the shank of the bolt 17 passes through an aperture 21 provided in the bar 11. The bolt 18 is similarly attached to the bar 10 by a pivot pin 22 which passes through the bifurcated right-hand end of the bar 10. The shank of the bolt 18 is received in a slot or bifurcation provided in the right-hand end of the bar 11 so as to permit the bolt to be swung counterclockwise about its pivot (FIG. 1) when the wing nut 16 is loosened. By loosening both wing nuts 15 and 16 and turning the swing bolt 18 about its pivot 22 to disengage the bolt from the slot in the right-hand end of bar 11, the bars may be swung apart, the bolt 17 pivoting about the pin 20 as this occurs. A piece of tubing is then placed in a recess 14 of appropriate size whereupon the bars are brought together and the swing bolt 18 returned to its clamping position whereupon both wing nuts 15 and 16 are tightened to securely clamp the tubing in the recess.

As shown in FIG. 2, the recesses 14 formed by clamping slots 12 and 13 are each provided with the usual serrations 25 so as to provide a secure grip on the tube and prevent it from slipping within the recess while the flare is being formed thereon. As also shown in FIG. 2, each recess is provided at one end with a chamfer 26 for backing up the flare as it is formed on the end of the tube by the flaring cone of the tool. As best shown in FIG. 2, the chamfers 26 are alternately disposed on opposite faces of the clamping bars so as to permit closer spacing of the recesses 14 without overlapping of the chamfers on adjacent recesses. This permits a substantial reduction in the size and weight of the clamping bars to be achieved without detracting in any way from the utility or efficiency of the clamping means, the clamping bars merely being turned over, if necessary, to bring the chamfered end of a recess of the correct size on the upper sides of the bars.

In FIGS. 3, 4 and 5 is shown another form of the invention in which the chamfers are all formed on the same side of the bars, but are made of greater than normal depth to secure advantages of the type previously mentioned. As shown in FIG. 3, the clamping bars 30 and 31 are of similar construction to the bars 10 and 11 shown in FIG. 1 and, like those bars, provided with wing nuts 32 and 33 which are screwed onto the threaded ends of clamp bolts 34 and 35, respectively. The clamp bolts are pivoted on hinge pins 36 and 37 so as to permit the bars 30 and 31 to be swung apart when the wing nuts are loosened.

The clamping bars are each provided with a series of semi-cylindrical clamping slots 38 and 39 which, when the bars are brought together, form cylindrical clamping recesses 40 for receiving and holding the tubing to be flared by the tube working tool (not shown). As further shown herein, each recess is provided at its upper end with a chamfer 41, the chamfers of adjoining recesses being adapted to overlap or intersect along a meeting edge 42 (see also FIG. 5) and thereby permit reduced spacing between recesses 40. The chamfers 41 are of greater than normal depth and the adjacent chamfers overlap one another only to the extent of the excess depth provided thereon.

The provision of chamfers of greater than normal depth has, as heretofore mentioned, the advantage of permitting flush gauging of the tube to be flared in order to provide properly dimensioned flares. Also, it eliminates the necessity for finish machining of the chamfers in cases where the bars are made by a powdered metal procedure.

In FIG. 4, a piece of tubing 45 to be flared is shown inserted in one of the clamping recesses 40 with its upper end abutting against the bottom surface of a gauge block 46 resting upon the top face of bars 30 and 31. After thus gauging the flare to be produced on the tube, the wing nuts 32 and 33 are tightened so as to securely hold the tube 45 in this position after which the flaring cone (not shown) is brought down into the upper end of the tube to spread it out against the face of the chamfer 41. The flare which results is illustrated in connection with a second piece of tubing 47 which is shown as it appears after having been gauged and flared out to engage with the wall of the chamfer formed in the upper end of the recess. As shown, the upper end of the flare does not extend beyond the meeting edge 42 between the adjacent chamfers so that the flare is supported by the chamfer 41 completely around its circumference and over its entire length. Hence, the overlap between adjoining chamfers extends only to the excess length thereof and, therefore, will not interfere with formation of a perfect flare on the end of the tube.

The bars 30 and 31 may be pressed from powdered metal and thereafter sintered to provide finished clamping bars having the clamping slots 38 and 39 already formed therein. As shown in FIG. 4, the slots are also preferably provided with counterbores 49 and serrations 50 and these, as well as the chamfers 41 may be impressed in the powdered metal compacts so that the bars, after sintering, are ready for use without the need of any subsequent machining operations. This is possible even though a small burr 51 will be pulled from the upper edge of the chamfer when the compact is removed from the mold. Since, due to the excess length of the chamfer, this burr lies above the upper end of the flare formed on the tube, it will have no harmful effect on the flare formed on the tube and need not be removed by a subsequent machining operation of the clamping bars after they have been sintered. Hence, by making the chamfers 41 on the ends of the recesses of greater than normal depth, and by overlapping the chamfers to the extent of their excess length, I have obtained the above-enumerated advantages while reducing the size and weight of the bars 30 and 31.

While I have described my invention in connection with one possible form or embodiment thereof and, have used, therefore, certain specific terms and language herein, it is to be understood that the present disclosure is illustrative rather than restrictive and that changes and modifications may be resorted to without departing from the spirit or scope of the claims which follow.

Having thus described my invention what I claim as new and useful and desire to secure by United States Letters Patent is:

1. A tube clamping means for tube flaring tools comprising a pair of clamping bars, a plurality of pairs of clamping slots in said bars, each pair of clamping slots defining a clamping recess for gripping a particular size of tube to be flared by the tool, and a chamfer formed at the end of each recess for supporting the flare formed on the tube, said chamfers all being disposed on the same side of said bars and the spacing between adjacent recesses being such that the chamfers thereof overlap one another so as to form an arcuate meeting edge between adjoining chamfers.

2. The tube clamping means of claim 1 wherein the bottom of said arcuate meeting edge lies above the upper end of a flare of standard dimensions formed on the end of a tube.

3. The tube clamping means of claim 1 wherein said chamfers are of greater length than the flare formed on the end of the tube, and wherein the degree of overlap between adjacent chamfers is such as not to reduce the length of the chamfers beyond that required by a flare of standard dimensions formed on the end of a tube.

References Cited in the file of this patent

UNITED STATES PATENTS

| | | |
|---|---|---|
| 2,180,033 | Cattio | Nov. 14, 1939 |
| 2,459,910 | Alvin | Jan. 25, 1949 |
| 2,595,036 | Wolcott | Apr. 29, 1952 |
| 2,662,574 | Franck | Dec. 15, 1953 |
| 2,662,575 | Wolcott | Dec. 15, 1953 |

FOREIGN PATENTS

| | | |
|---|---|---|
| 1,026,039 | France | Jan. 28, 1953 |